(12) United States Patent
Hatfield

(10) Patent No.: US 10,093,270 B2
(45) Date of Patent: Oct. 9, 2018

(54) MULTI-FLAP VENTS FOR INFLATABLE CHAMBERS

(71) Applicant: AUTOLIV ASP, INC., Ogden, UT (US)

(72) Inventor: Mark S. Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 14 days.

(21) Appl. No.: 14/994,290

(22) Filed: Jan. 13, 2016

(65) Prior Publication Data
US 2017/0197578 A1    Jul. 13, 2017

(51) Int. Cl.
*B60R 21/239*    (2006.01)

(52) U.S. Cl.
CPC .................. *B60R 21/239* (2013.01)

(58) Field of Classification Search
CPC .......... B60R 21/239; B60R 2021/2395; B60R 21/26
See application file for complete search history.

(56) References Cited

U.S. PATENT DOCUMENTS

| | | |
|---|---|---|
| 2,937,380 A | 5/1960 | Reese |
| 3,887,213 A | 6/1975 | Goetz |
| 4,169,613 A | 10/1979 | Barnett |
| 4,181,325 A | 1/1980 | Barnett |
| 4,805,930 A | 2/1989 | Takada |
| 5,016,913 A | 5/1991 | Nakajima et al. |
| 5,172,933 A | 12/1992 | Strasser |
| 5,186,488 A | 2/1993 | Takano |
| 5,240,283 A | 8/1993 | Kishi et al. |
| 5,246,250 A | 9/1993 | Wolanin et al. |
| 5,280,953 A | 1/1994 | Wolanin et al. |
| 5,290,953 A | 3/1994 | Clark, Jr. et al. |
| 5,306,043 A | 4/1994 | Mihm et al. |
| 5,350,188 A | 9/1994 | Sato |
| 5,405,166 A | 4/1995 | Rogerson |
| 5,421,607 A | 6/1995 | Gordon |
| 5,492,363 A | 2/1996 | Hartmeyer et al. |
| 5,494,314 A | 2/1996 | Kriska et al. |
| 5,520,413 A | 5/1996 | Mossi et al. |
| 5,603,526 A | 2/1997 | Buchanan |
| 5,775,729 A | 7/1998 | Schneider et al. |
| 5,839,755 A | 11/1998 | Turnbull |
| 5,931,497 A | 8/1999 | Fischer |

(Continued)

FOREIGN PATENT DOCUMENTS

| | | |
|---|---|---|
| AU | 2005294731 | 8/2012 |
| DE | 19640322 A1 | 3/1996 |

(Continued)

OTHER PUBLICATIONS

International Search Report and Written Opinion for PCT/US2017/012169 dated Mar. 29, 2017.

*Primary Examiner* — Faye M Fleming
(74) *Attorney, Agent, or Firm* — Stoel Rives, LLP

(57) ABSTRACT

A vent for an inflatable chamber, such as an airbag cushion, can include a first flap and a second flap. The first flap and second flap can be opposing and/or overlapping. The first flap and the second flap impede fluid flow through the vent when the vent is in a closed state. Free ends of the first flap and the second flap can be positioned at an exterior of the inflatable chamber when the vent is in the open state.

20 Claims, 14 Drawing Sheets

(56) References Cited

U.S. PATENT DOCUMENTS

| | | | |
|---|---|---|---|
| 5,945,184 A | 8/1999 | Nagata et al. | |
| 6,017,057 A | 1/2000 | O'Docherty | |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschadel | |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,290,257 B1 | 9/2001 | Bunce et al. | |
| 6,371,509 B1 | 4/2002 | Ellerbrok et al. | |
| 6,390,501 B1 | 5/2002 | Greib et al. | |
| 6,398,258 B2 | 6/2002 | Hamada et al. | |
| 6,419,267 B1 | 7/2002 | Hashimoto et al. | |
| 6,554,313 B2 | 4/2003 | Uchida | |
| 6,631,921 B1 | 10/2003 | Drossler et al. | |
| 6,631,922 B2 | 10/2003 | Hess et al. | |
| 6,648,371 B2 | 11/2003 | Vendely | |
| 6,722,695 B2 | 4/2004 | Kobayashi et al. | |
| 6,746,045 B2 | 6/2004 | Short et al. | |
| 6,773,027 B2 | 8/2004 | Bohn et al. | |
| 6,773,030 B2 | 8/2004 | Vischer | |
| 6,784,379 B2 | 8/2004 | Breed et al. | |
| 6,786,505 B2 | 9/2004 | Yoshida et al. | |
| 6,832,778 B2 | 12/2004 | Pinsenschaum et al. | |
| 6,863,304 B2 | 3/2005 | Reiter et al. | |
| 6,918,613 B2 | 7/2005 | Short et al. | |
| 6,932,385 B2 | 8/2005 | Hawthorn et al. | |
| 6,962,363 B2 | 11/2005 | Wang et al. | |
| 6,971,664 B2 | 12/2005 | Amamori et al. | |
| 6,971,671 B2 | 12/2005 | Schneider et al. | |
| 7,059,634 B2 | 6/2006 | Bossecker et al. | |
| 7,066,487 B2 | 6/2006 | Sullivan et al. | |
| 7,083,191 B2 | 8/2006 | Fischer | |
| 7,083,192 B2 | 8/2006 | Fischer et al. | |
| 7,195,281 B2 | 3/2007 | Williams et al. | |
| 7,210,702 B2 | 5/2007 | Soderquist | |
| 7,237,802 B2 | 7/2007 | Rose et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,360,789 B2 | 4/2008 | Bito | |
| 7,364,192 B2 | 4/2008 | Braun et al. | |
| 7,377,548 B2 | 5/2008 | Bauer et al. | |
| 7,413,218 B2 | 8/2008 | Ekdahl | |
| 7,441,805 B2 | 10/2008 | Jamison et al. | |
| 7,475,906 B2 * | 1/2009 | Goto | B60R 21/2338 280/738 |
| 7,556,290 B2 | 7/2009 | Williams et al. | |
| 7,568,729 B2 | 8/2009 | Schnieder et al. | |
| 7,597,355 B2 | 10/2009 | Williams et al. | |
| 7,597,356 B2 | 10/2009 | Williams | |
| 7,600,782 B2 * | 10/2009 | Ishiguro | B60R 21/239 280/739 |
| 7,604,252 B2 | 10/2009 | Heitplatz et al. | |
| 7,607,689 B2 | 10/2009 | Kalczynski et al. | |
| 7,607,690 B2 | 10/2009 | Abe et al. | |
| 7,614,653 B2 | 11/2009 | Rose et al. | |
| 7,614,654 B2 | 11/2009 | Williams | |
| 7,651,130 B2 | 1/2010 | Bauberger | |
| 7,654,561 B2 | 2/2010 | Webber et al. | |
| 7,673,899 B2 | 3/2010 | Abe | |
| 7,722,080 B2 | 5/2010 | Rose et al. | |
| 7,726,685 B2 | 6/2010 | Abe et al. | |
| 7,748,738 B2 | 7/2010 | Schneider | |
| 7,762,576 B2 | 7/2010 | Cho | |
| 7,770,925 B2 | 8/2010 | Seymour et al. | |
| 7,770,926 B2 | 8/2010 | Schneider et al. | |
| 7,784,828 B2 | 8/2010 | Matsu et al. | |
| 7,857,347 B2 | 12/2010 | Abe et al. | |
| 7,874,584 B2 * | 1/2011 | Carvalho Marques | B60R 21/239 280/736 |
| 7,878,538 B2 | 2/2011 | Abe et al. | |
| 7,931,297 B2 | 4/2011 | Abe et al. | |
| 7,938,444 B2 | 5/2011 | Williams et al. | |
| 7,938,445 B2 | 5/2011 | Smith et al. | |
| 7,946,613 B2 | 5/2011 | Rose et al. | |
| 7,959,184 B2 | 6/2011 | Fukawatase et al. | |
| 8,047,570 B2 | 11/2011 | Feller | |
| 8,070,183 B2 | 12/2011 | Kumagai et al. | |
| 8,191,925 B2 | 6/2012 | Williams | |
| 8,226,118 B2 | 7/2012 | Rose et al. | |
| 8,353,532 B2 * | 1/2013 | Abe | B60R 21/2338 280/739 |
| 8,491,004 B2 * | 7/2013 | Mendez | B60R 21/2338 280/739 |
| 8,646,808 B2 | 2/2014 | Williams | |
| 8,882,143 B2 | 11/2014 | Williams et al. | |
| 9,027,962 B1 * | 5/2015 | Jang | B60R 21/239 280/743.1 |
| 9,150,188 B2 | 10/2015 | Williams et al. | |
| 9,187,056 B1 * | 11/2015 | Kwon | B60R 21/2338 |
| 2002/0117840 A1 | 8/2002 | Dunkle et al. | |
| 2003/0020266 A1 | 1/2003 | Vendely et al. | |
| 2003/0030254 A1 | 2/2003 | Hasebe | |
| 2003/0057691 A1 | 3/2003 | Tokita et al. | |
| 2003/0020268 A1 | 6/2003 | Reiter et al. | |
| 2003/0127839 A1 | 7/2003 | Jenkins | |
| 2003/0201630 A1 | 10/2003 | Moon | |
| 2003/0209895 A1 | 11/2003 | Gu | |
| 2003/0214125 A1 | 11/2003 | Schneider et al. | |
| 2003/0222446 A1 | 12/2003 | Soderquist et al. | |
| 2004/0012179 A1 | 1/2004 | Pinsenschaum et al. | |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0256842 A1 | 12/2004 | Breed | |
| 2005/0052008 A1 | 3/2005 | Rose et al. | |
| 2005/0057027 A1 | 3/2005 | Fogle, Jr. et al. | |
| 2005/0098990 A1 | 5/2005 | Pinsenschaum et al. | |
| 2005/0236822 A1 | 10/2005 | Rose et al. | |
| 2005/0248137 A1 | 11/2005 | Delventhal et al. | |
| 2006/0001244 A1 | 1/2006 | Taguchi et al. | |
| 2006/0071461 A1 | 4/2006 | Williams et al. | |
| 2006/0071462 A1 | 4/2006 | Smith et al. | |
| 2006/0151979 A1 | 7/2006 | DePottey et al. | |
| 2006/0192370 A1 | 8/2006 | Abe et al. | |
| 2006/0197327 A1 | 9/2006 | Maripudi et al. | |
| 2006/0202454 A1 | 9/2006 | Parizal et al. | |
| 2006/0284404 A1 | 12/2006 | Green et al. | |
| 2006/0290116 A1 * | 12/2006 | Bradburn | B60R 21/239 280/739 |
| 2007/0013177 A1 * | 1/2007 | Abe | B60R 21/239 280/739 |
| 2007/0045997 A1 | 3/2007 | Abe et al. | |
| 2007/0052222 A1 | 3/2007 | Higuchi et al. | |
| 2007/0108750 A1 | 5/2007 | Bauer et al. | |
| 2007/0126218 A1 | 6/2007 | Schnieder et al. | |
| 2007/0126219 A1 | 6/2007 | Williams | |
| 2007/0132222 A1 | 6/2007 | Thomas et al. | |
| 2007/0145729 A1 | 6/2007 | Ishiguro et al. | |
| 2007/0205590 A1 | 9/2007 | Klinkenberger et al. | |
| 2007/0216146 A1 | 9/2007 | Williams | |
| 2008/0007038 A1 | 1/2008 | Fischer et al. | |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0073890 A1 | 3/2008 | Williams et al. | |
| 2008/0073891 A1 | 3/2008 | Rose et al. | |
| 2008/0073892 A1 | 3/2008 | Rose et al. | |
| 2008/0073893 A1 | 3/2008 | Schneider | |
| 2008/0079250 A1 | 4/2008 | Boyle et al. | |
| 2008/0203713 A1 | 8/2008 | McFadden et al. | |
| 2008/0303256 A1 | 12/2008 | Williams | |
| 2009/0033081 A1 | 2/2009 | Flischer et al. | |
| 2009/0039630 A1 | 2/2009 | Schneider et al. | |
| 2009/0121460 A1 | 5/2009 | Abe et al. | |
| 2009/0230663 A1 | 9/2009 | Mills et al. | |
| 2009/0256338 A1 | 10/2009 | Williams | |
| 2010/0019476 A1 | 1/2010 | Pausch | |
| 2010/0032931 A1 | 2/2010 | Kumagai et al. | |
| 2010/0102542 A1 | 4/2010 | Nakajima et al. | |

(56) References Cited

U.S. PATENT DOCUMENTS

| | | |
|---|---|---|
| 2010/0140908 A1 | 6/2010 | Abe |
| 2010/0225094 A1 | 9/2010 | Rose et al. |
| 2010/0225095 A1 | 9/2010 | Smith et al. |
| 2011/0031725 A1 | 2/2011 | Rose et al. |
| 2011/0101663 A1* | 5/2011 | Schneider ............ B60R 21/239 280/743.1 |
| 2012/0038138 A1 | 2/2012 | Kuhne et al. |
| 2012/0280477 A1 | 11/2012 | Young et al. |
| 2013/0042441 A1 | 2/2013 | Maurer |
| 2014/0062071 A1 | 3/2014 | Ishiguro et al. |
| 2014/0225354 A1 | 8/2014 | Williams et al. |
| 2015/0021889 A1 | 1/2015 | Williams et al. |
| 2015/0042080 A1 | 2/2015 | Guerrero et al. |
| 2015/0266447 A1* | 9/2015 | Hiruta ................... B60R 21/203 280/731 |

FOREIGN PATENT DOCUMENTS

| | | |
|---|---|---|
| DE | 10059956 A1 | 6/2002 |
| DE | 19517315 C2 | 4/2003 |
| DE | 102004049513 A1 | 4/2006 |
| EP | 0458838 B1 | 5/1996 |
| EP | 1398228 A2 | 3/2004 |
| EP | 1824710 B1 | 6/2009 |
| EP | 1960240 B1 | 8/2011 |
| GB | 2328464 A | 3/1999 |
| JP | 03281460 | 12/1991 |
| JP | 05085295 A | 4/1993 |
| JP | 08268213 | 10/1996 |
| JP | 2001158315 | 6/2001 |
| JP | 2003137060 | 5/2003 |
| JP | 2004262432 A | 9/2004 |
| JP | 4871286 B2 | 2/2012 |
| MX | 282893 | 1/2011 |
| WO | 2004045919 A1 | 6/2004 |
| WO | 2006041547 A2 | 4/2006 |
| WO | 2006041552 A2 | 4/2006 |
| WO | 2006073534 A2 | 7/2006 |
| WO | 2007067371 A2 | 6/2007 |
| WO | 2007067377 A2 | 6/2007 |
| WO | 2008150578 A1 | 12/2008 |
| WO | 2009020786 A1 | 2/2009 |
| WO | 2010101673 A1 | 9/2010 |
| WO | 2010121717 A1 | 10/2010 |

* cited by examiner

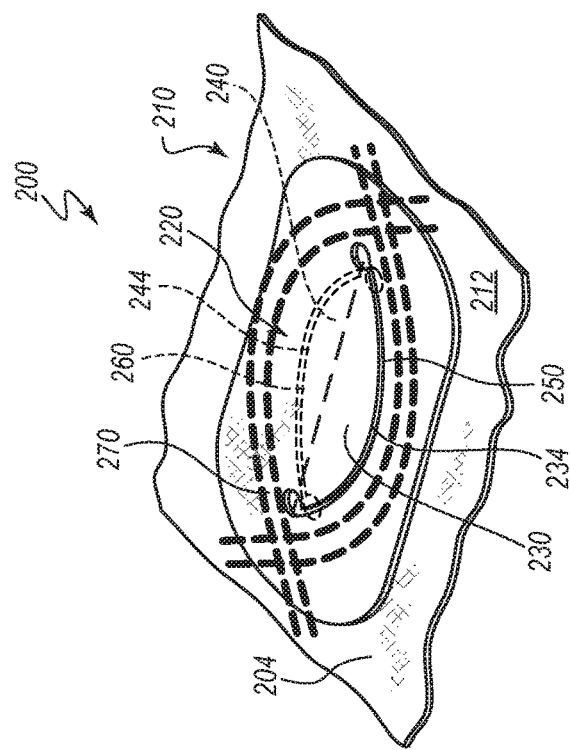
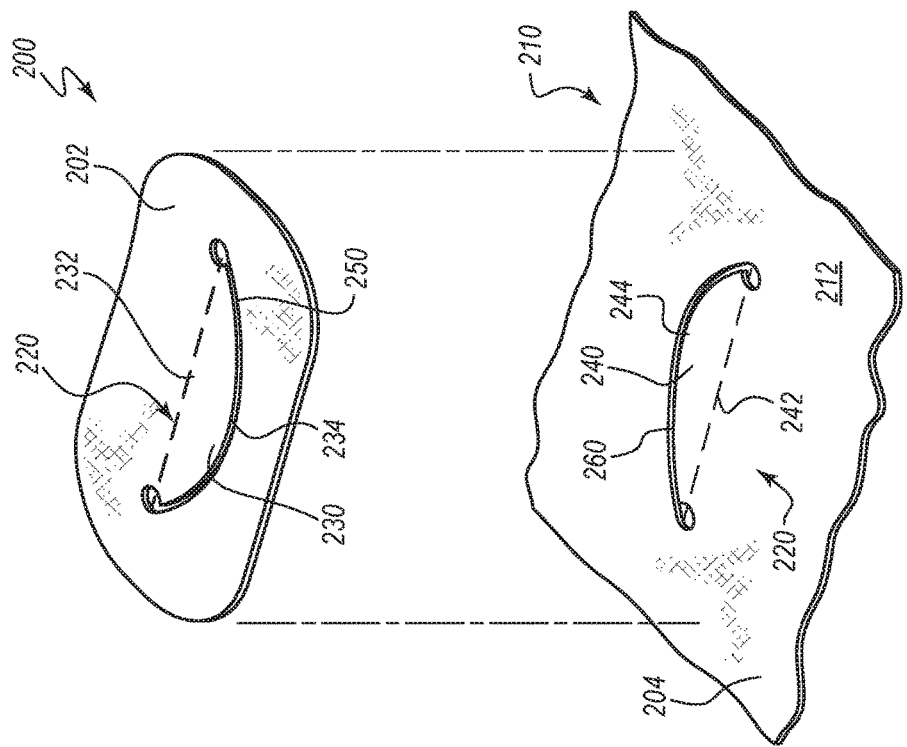
FIG. 4A
FIG. 4B

MULTI-FLAP VENTS FOR INFLATABLE CHAMBERS

TECHNICAL FIELD

The present disclosure relates generally to the field of venting for inflatable chambers. More particularly, the present disclosure relates to airbags and vents that include a plurality of flaps to regulate the release of air from an inflatable chamber.

BACKGROUND

Vents for inflatable chambers, such as airbag cushions, are used to regulate the release of air from an inflatable chamber. Some airbags and/or vents suffer from one or more design constraints or may be subject to different performance criteria based on the conditions. Certain embodiments disclosed herein can enhance performance of airbags.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 4A is an interior exploded perspective view of a vent according to another embodiment.

FIG. 4B is an interior assembled perspective view of the vent of FIG. 4A.

DETAILED DESCRIPTION

Figure 1A:
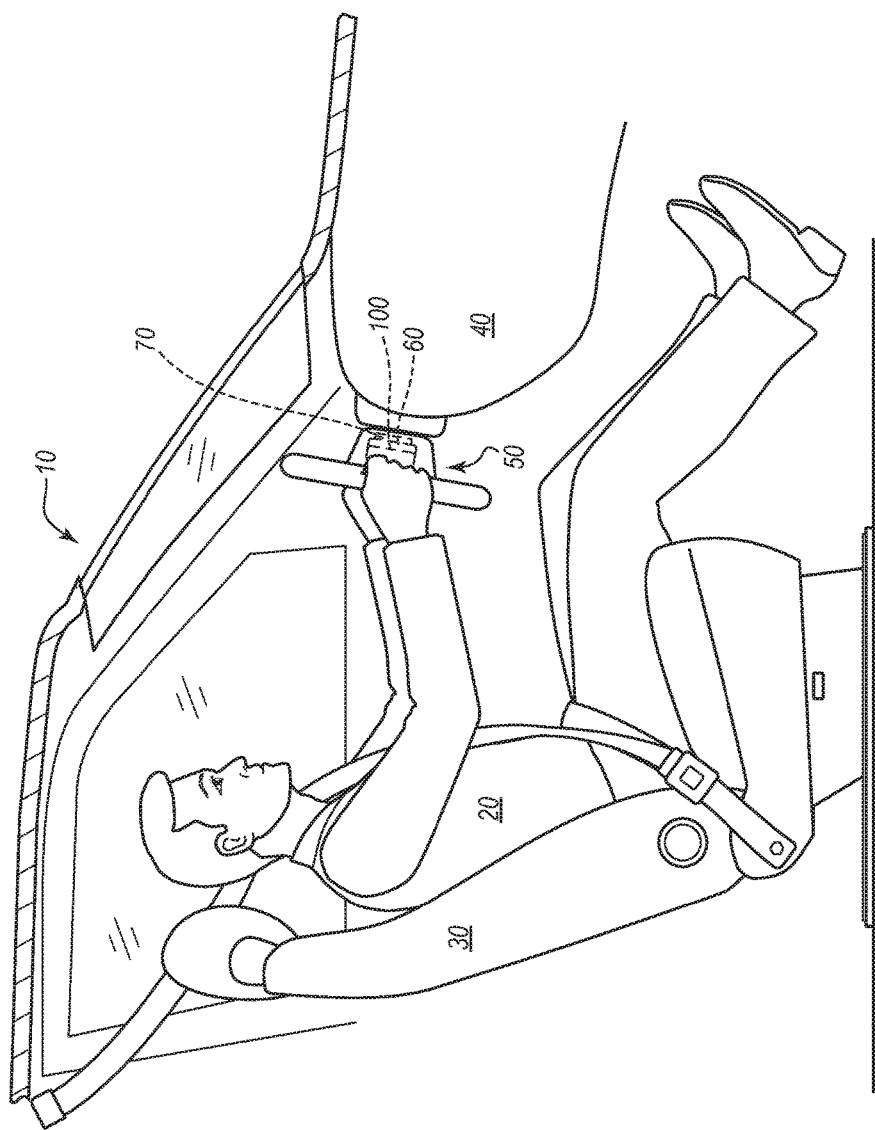
FIG. 1A is a side view of an un-deployed airbag, according to one embodiment of the present disclosure, mounted in a vehicle.

Inflatable chambers may be employed for various purposes, such as cushioning an occupant during a collision event. In some circumstances, an inflatable airbag may be installed at one or more locations within a vehicle to reduce or minimize occupant injury during a collision event. For example, airbags may be installed in steering wheels and/or dashboards, among other locations. In the following disclosure, specific reference is made to airbags to be deployed from a steering wheel or dashboard, although the principles discussed herein may apply to airbags that are disposed at and/or deployable from other locations in a vehicle, such as side airbags or airbags for cushioning back-seat occupants. The principles discussed herein may also be applied to knee airbags or other venting airbags.

Airbags are typically installed within a housing in a compact packaged state (e.g., rolled, folded, or otherwise compressed) and may be retained in the packaged state behind a cover. During a collision event, an inflator may be triggered, which rapidly fills the airbag with inflation gas. The inflation gas may cause the airbag to rapidly transition from the compact packaged state (i.e., an un-deployed state) to an expanded state (e.g., deployed state). In some embodiments, the expanding airbag opens an airbag cover (e.g., by tearing through a thinned section of the cover or opening a door-like structure) to exit the housing. The inflator may be triggered by any suitable device or system, and the triggering may be in response to and/or influenced by one of more vehicle sensors.

During a collision event, one or more airbags may deploy toward a vehicle occupant, such as the driver or an occupant seated in the passenger seat of the vehicle. Such airbags may be configured to receive the torso and/or head of the occupant during a collision event. More particularly, the one or more airbags may deploy toward a vehicle seating position. The vehicle seating position may be defined by a seat (e.g., a driver seat or a front passenger seat) and may be a position in which an occupant may be seated prior to and/or during a collision event or a position in which the vehicle and/or the seat is designed to transport an occupant.

An airbag may include one or more vents. These vents may be used to regulate the release of air from an inflatable chamber of the airbag. In some embodiments disclosed herein, a vent is configured to transition from a closed state to an open state during a deployment event. For example, in some embodiments, the vent transitions from a closed state to an open state due to (1) pressure buildup within an inflatable chamber of the airbag and/or (2) engagement of an occupant with the airbag.

By regulating the release of air, these vents may control or otherwise affect the air pressure within an airbag during a collision event. For example, vents that are relatively inefficient at directing air out of an airbag may provide increased resistance to occupants that engage with the airbag. In other words, due to the relatively high pressure within the airbag, an airbag with relatively low venting capacity may exert a relatively high force on the occupant at occupant impact and/or during occupant ride-down. Conversely, vents that allow for more efficient venting during a collision event may provide less resistance to an occupant. In other words, due to the relatively low air pressure within the airbag, an airbag with high venting capacity may exert a relatively low force on the occupant at occupant impact and/or during occupant ride-down.

In general, the optimal amount of air pressure within an airbag during a collision event depends on a number of factors, such as the kinetic energy of the occupant and whether the occupant is out of position during the collision event. Further, in some circumstances, the optimal amount of air pressure within an airbag varies during a collision event. Accordingly, an airbag that is configured to alter the air pressure profile within the airbag during a collision event based on one or more of (1) the kinetic energy of the occupant and/or (2) the position of the occupant during the collision event, may provide advantages over airbag assemblies that fail to take into account such considerations (or that take such considerations into account in other ways). Additionally or alternatively, airbag assemblies that provide such adaptive venting without requiring (1) multi-stage inflators and/or (2) input from one or more additional electrical sensors may be more cost-effective than airbag assemblies that require such components.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "coupled to" is used in its ordinary sense, and is broad enough to refer to any suitable coupling or other form of interaction between two or more entities, including mechanical and fluid interaction. Two components may be coupled to each other even though they are not in direct contact with each other. The phrase "attached to" refers to interaction between two or more entities which are in direct contact with each other and/or are separated from each other only by a fastener of any suitable variety (e.g., mounting hardware or an adhesive).

As used herein, the terms "forward" and "rearward" are used with reference to the front and back of the relevant vehicle. For example, an airbag cushion that deploys in a rearward direction deploys toward the rear of the vehicle. The terms "top" and "bottom" are used with reference to the position of the element when the airbag is in an inflated state within a vehicle and the relevant vent is closed. For example, the "top end" of a flap is disposed generally above the "bottom end" of the flap when the airbag is in a deployed state, even if the "top end" of the flap is below or lateral of the "bottom end" of the flap in one or more of the figures described below due to the orientation of the particular figure. The terms "open state" and "closed state" refer to different venting states in which the air pathway through a vent is more obstructed in the "closed state" than in the "open state." The use of the term "closed state" does not necessarily imply that no amount of air may pass through the vent when the vent is in the closed state. The term "occupant" refers to a person or crash test dummy seated within a vehicle. The term "vehicle" may refer to any vehicle, such as a car, truck, bus, airplane, etc. "Venting capacity" refers to the degree to which potential flow paths out of an airbag cushion are unobstructed. For example, in an airbag with higher venting capacity, the vents of the airbag may be largely unobstructed. In an airbag with lower venting capacity, the vents may be obstructed to a greater degree.

Figure 1B:
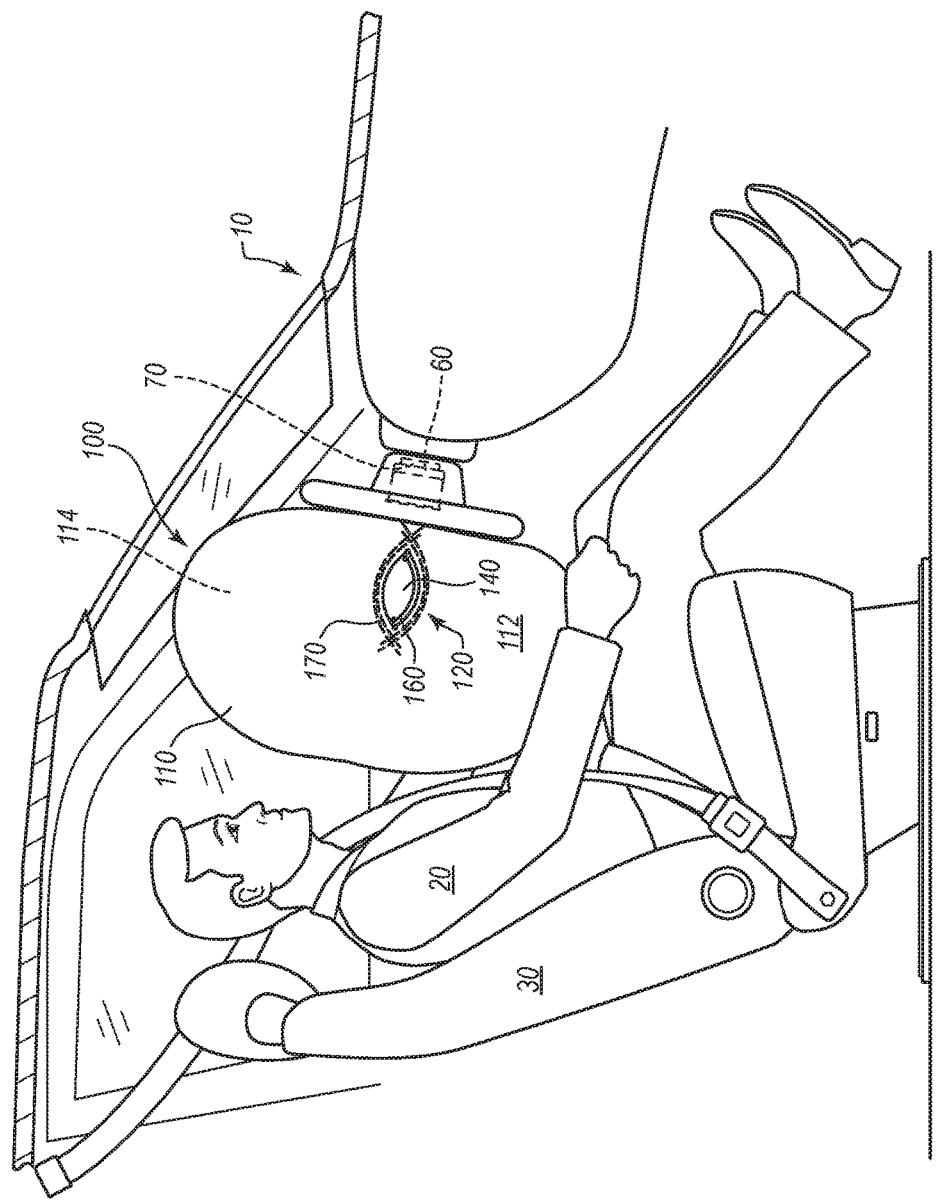
FIG. 1B is a side view of the airbag of FIG. 1A in a deployed state with a vent, according to one embodiment of the present disclosure, in a closed state.
Figure 1C:
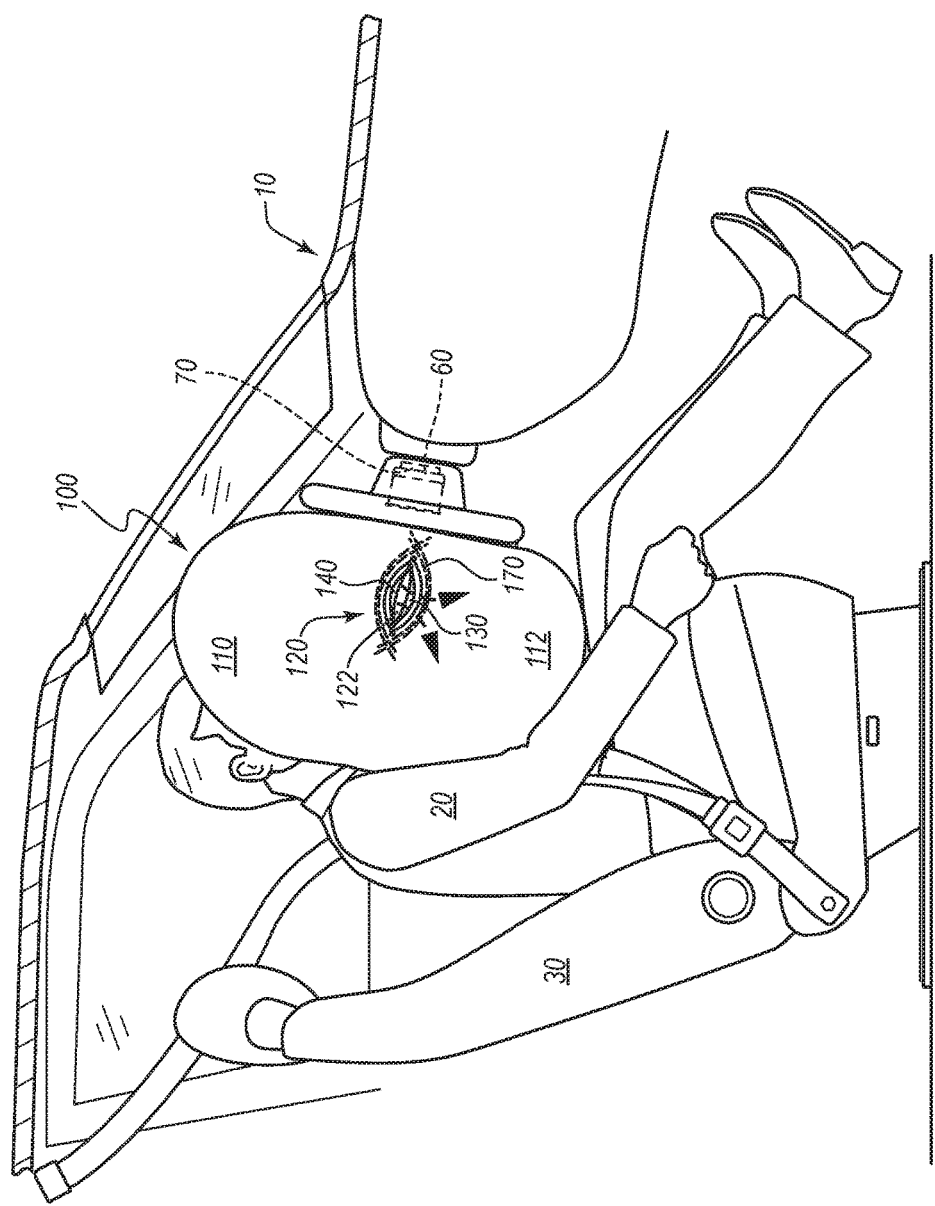
FIG. 1C is a side view of the deployed airbag of FIG. 1B with the vent in an open state.

FIGS. 1A-1C provide side views of an airbag 100, according to one embodiment of the present disclosure, in various states. More particularly, FIG. 1A shows the airbag 100 in an un-deployed state in an airbag housing 60 of a vehicle 10. FIG. 1B depicts the airbag 100 in a deployed state with a vent 120, according to one embodiment of the present disclosure, in a closed state. FIG. 1C shows the airbag 100 in a deployed state with the vent 120 of the airbag 100 in an open state.

As depicted in FIG. 1A, the airbag 100 may be disposed within an airbag housing 60 of a vehicle 10 prior to a deployment event. Stated differently, the airbag 100 may be stored within the housing 60 in a packaged stated (e.g., rolled, folded, or otherwise compressed) or otherwise un-deployed state. In the depicted embodiment, the airbag housing 60 is disposed within the steering column 50 of the vehicle 10. In other embodiments, the airbag housing 60 may be disposed within a dashboard 40 or some other vehicular structure. The airbag 100 and airbag housing 60 may be positioned to cushion a vehicle driver as depicted in FIGS. 1A-1C. In other embodiments, the airbag and airbag housing may be positioned such that the airbag deploys to cushion some other occupant, such as a front-seat passenger.

In response to (or in anticipation of) a collision event, an inflator 70 may be triggered, which rapidly fills the airbag 100 with inflation gas. The inflation gas may cause the airbag 100 to rapidly transition from a compact packaged state (as shown in FIG. 1A) to a deployed state (as shown in FIGS. 1B and 1C). In some embodiments, the airbag 100 deploys rearward toward a vehicle occupant 20 that is seated in a seat 30 (e.g., a front seat) of the vehicle 10 or toward a seating position of the vehicle 10.

With reference to FIGS. 1B and 1C, the airbag 100 may, when deployed, extend from the housing 60 toward an occupant 20 seated in a seat 30 of the vehicle 10 or toward a seating position of the vehicle 10. The airbag 100 may include an airbag cushion 110 and a vent 120.

The airbag cushion 110 may define an inflatable chamber 114 that is configured to receive inflation gas from the inflator 70. The airbag cushion 110 may also include one or more panels 112. For example, in the depicted embodiment, the airbag cushion 110 is primarily formed from a single outer panel 112 (i.e., a uniform piece of material). In other embodiments, the airbag cushion may be formed from a plurality of panels that are attached to one another by any suitable method (e.g., stitching, radio frequency welding, heat sealing, etc.). The panel 112 may include a substantially planar portion that surrounds the vent 120. As shown in FIGS. 1B and 1C, the substantially planar portion of the panel 112 that surrounds the vent 120 may be disposed on a lateral side of the airbag cushion 110.

The vent 120 may be configured to regulate the flow of air through the panel 112 of the airbag cushion 110. Stated differently, the vent 120 may be configured to regulate the flow of air from an inflatable chamber 114. In the depicted embodiment of FIGS. 1B and 1C, the vent 120 includes two or more flaps 130, 140 that impede fluid flow through the vent 120 when the vent 120 is in the closed state as shown in FIG. 1B (only flap 140 is visible in FIG. 1B and both flaps 130, 140 are visible in FIG. 1C). Stitching 170 or some other coupling element(s) may be used to couple adjacent pieces of material to one another to form the flaps 130, 140 and/or the vent 120. The stitching 170 or other coupling element(s) may also provide reinforcement to material adjacent the vent 120, thereby decreasing the risk of tears adjacent the vent 120 during deployment.

During a deployment event, the vent 120 may transition from a closed state (as shown in FIG. 1B) to an open state (as shown in FIG. 1C) to vent air through a panel 112 of the airbag cushion 110. For example, during an early stage of deployment, the flaps 130, 140 may impede fluid flow through the vent 120. Subsequently, the vent 120 may open as depicted in FIG. 1C. Such a transition may occur due to forces that arise from (1) increased pressure within the airbag cushion 110 and/or (2) occupant 20 impact with the airbag cushion 110.

During an early stage of deployment, the airbag cushion 110 may fill with inflation gas. During this early stage, the flaps 130, 140 may be overlapping and oriented substantially parallel to the portions of the panel 112 that are immediately adjacent to the periphery of the vent 120. Stated differently, during an early stage of deployment, outward displacement of the first flap 130 may be impeded by a piece of material (e.g., the second piece of material 104 described below in connection with FIGS. 2A and 2B) when the vent 120 is in the closed state. At a subsequent stage of deployment, the vent 120 may transition to an open state. For example, at this stage, an occupant 20 may strike the airbag cushion 110 (see FIG. 1C). More particularly, in some circumstances, the occupant 20 may move in a generally forward direction to engage with the airbag cushion 110. Engagement of the airbag cushion 110 by the occupant 20 may cause the pressure of inflation gases within the airbag cushion 110 to increase. In other words, loading of the occupant 20 onto the airbag cushion 110 may result in an increase in pressure within the airbag cushion 110. As a result of this increase in pressure within the airbag cushion 110, the flaps 130, 140 may be forced or otherwise displaced outward such that the free ends of the flaps 130, 140 are positioned at an exterior of the inflatable chamber 114 and extend outward transverse to portions of the panel 12 that are immediately adjacent to the periphery of the vent 120. In this manner, the vent 120 may be configured to transition from the closed state to the open state at a predetermined pressure.

With the flaps 130, 140 positioned at an exterior of the inflatable chamber 114, the flaps 130, 140 and/or the vent 120 may form an aperture 122 that releases air from the inflatable chamber 114. Stated differently, when the flaps 130, 140 are positioned at an exterior of the inflatable chamber 114, the vent 120 may be in an open state that allows for the venting of inflation gas. The aperture 122 may be elongate in shape when the vent 120 is in the open state. In some embodiments of the vent 120, the aperture 122 may have a maximum length that is less than 150 mm and/or greater than 20 mm (e.g., less than 90 mm and greater than 50 mm in length) when the vent 120 is in the open state. In other or further embodiments, the elongate aperture 122 has a maximum width that is less than or equal to 50, 40, or 30 mm and/or greater than 7, 10, 20, or 30 mm when the vent 120 is in the open state. In some embodiments, a ratio of a length of the aperture 122 to a width of the aperture 122 may be tailored to provide sufficient internal pressure during ride-down for cushioning the occupant while minimizing or eliminating occupant injury. In some embodiments, the ratio of a length of the aperture 122 to a width of the aperture 122 is between approximately 4:1 and 5:1. The size and shape of the vent 120 and/or the aperture 122 may be tailored based on airbag cushion 110 size, inflator size 70, and/or restraint requirements.

In some instances, the vent 120 may transition from the closed state (see e.g., FIG. 1B) to the open state (see, e.g., FIG. 1C) earlier than usual during a deployment event due to engagement of an out-of-position occupant 20 with the airbag cushion 110. Stated differently, the vent 120 may transition from the closed state to the open state due to engagement with an occupant 20 that strikes the airbag cushion 110 prior to full inflation of the airbag cushion 110. Such a transition may result from an abnormal increase in pressure within the airbag cushion 110 that arises due to early engagement of the occupant 20 with the airbag cushion 110. In this manner, the airbag 100 may provide passive adaptive venting for an out-of-position occupant. The vent 120 enables desired passive adaptive venting to reduce risk to an out-of-position occupant.

Figure 2B:
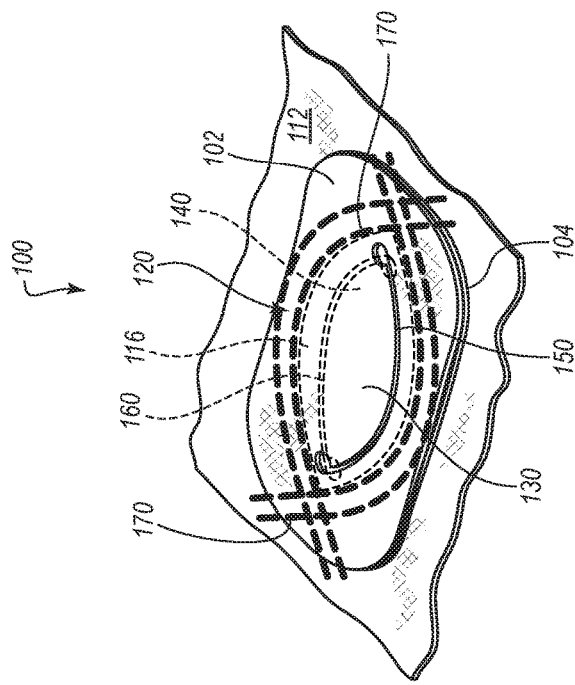
FIG. 2B is an interior assembled perspective view of the vent of FIG. 2A.
Figure 2A:
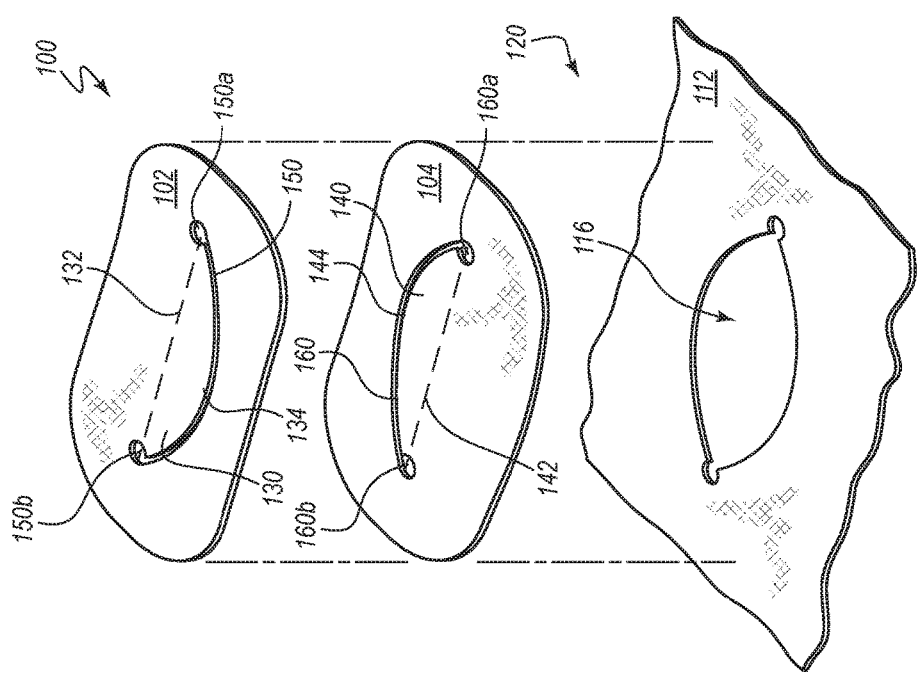
FIG. 2A is an interior exploded perspective view of the vent of the airbag of FIG. 1B.

FIGS. 2A and 2B provide interior views of a portion of the airbag 100. More particularly, FIG. 2A provides an exploded perspective view of an interior portion of the airbag 100 that includes the vent 120, while FIG. 2B provides an assembled perspective view of the same portion of the airbag 100. FIGS. 2A and 2B illustrate one example of construction of the vent 120. In these figures, the vent 120 is shown in the closed state.

In the embodiment of FIGS. 2A and 2B, the vent 120 is formed from a first piece of material 102, a second piece of material 104, and a portion of an airbag panel 112. As shown in FIGS. 2A and 2B, when the vent 120 is in the closed state, the first piece of material 102 is positioned inward of (or more interior to) the second piece of material 104, and the second piece of material 104 is positioned inward of the panel 112. Stated differently, one or more of the first flap 130 and the second flap 140 may be positioned at an interior of the inflatable chamber when the vent 120 is in the closed state.

In the depicted embodiment, the first piece of material 102 includes a first flap 130 that is formed from a first slit 150. The first flap 130 includes a free top end 134 and a secured bottom end 132. The free end 134 extends from the secured end 132 of the first flap 130 in a first direction. For example, when the vent 120 is installed as shown in FIG. 1B, the free end 134 may extend in a first (e.g., a generally upward) direction from the secured end 132.

The first flap 130 may be any suitable shape. For example, in the depicted embodiment, the flap 130 is substantially D-shaped. In other words, the region disposed within a perimeter that is defined by (1) the slit 150 and (2) a line that extends between the ends 150a, 150b of the slit 150 may be D-shaped. In some embodiments, the slit 150 defines a curve. More particularly, in some embodiments, the slit 150 comprises a curve that lacks an inflection point.

In some embodiments, the slit 150 is formed by cutting the first piece of material 102 without removing a portion of the first piece of material 102. In other words, the slit 150 may be formed by simply cutting along a path on the first piece of material 102. In other embodiments, a wider slit 150 may be obtained by removing a portion of the first piece of material 102 when forming the slit 150. In some embodiments, the slit 150 comprises a width of more than 1 mm, 2 mm, and/or 3 mm. In some embodiments, a slit 150 of relatively large width may facilitate less obstructed venting (e.g., a greater venting capacity) than a narrower slit 150.

In some embodiments, the width of the slit 150, 160 may vary along the length of the slit 150, 160. For example, in some embodiments, the width of the slit 150, 160 may be greater at or adjacent to the ends 150a, 150b, 160a, 160b of the slit 150, 160 than at other locations along the length of the slit 150, 160. For example, in the embodiment depicted in FIGS. 2A and 2B, each slit 150, 160 includes a hole at each end 150a, 150b, 160a, 160b of the slit 150, 160. In other embodiments, the width of the slit may be greater at a position more central to or between the ends of the slit than at the ends of the slit The second piece of material 104 may be attached to the first piece of material 102 and disposed outward of the first piece of material 102 when the vent 120 is in the closed state. In the depicted embodiment, the second piece of material 104 includes a flap 140 that is formed from a second slit 160. The second flap 140 and the second slit 160 may be similar to the first flap 130 and first slit 150 in many respects. Accordingly, the relevant description of features described above in connection with the first flap 130 and the first slit 150 generally applies to features of the second flap 140 and the second slit 160. In the embodiment of FIGS. 2A and 2B, the second flap 140 includes a secured top end 142 and a free bottom end 144. When the airbag 100 is deployed within the vehicle such that vent 120 is in the closed state (e.g., as shown in FIG. 1B), the free end 144 of the second flap 140 may extend from the secured end 142 in a generally downward direction. In other words, the free end 134 of the first flap 130 may extend from the secured end 132 of the first flap 130 in a first direction, while the free end 144 of the second flap 140 extends from the secured end 142 of the second flap 140 in a second direction that may be opposite of the first direction. In other words, the flaps 130, 140 may be opposing one another. The flaps 130, 140 may be oriented or otherwise configured to at least partially overlap one another.

In the embodiment of FIGS. 2A and 2B, the panel 112 includes an opening 116. In some embodiments, the opening 116 is elongate in shape. More particularly, in the depicted embodiment, the opening 116 is biconvex in shape. Stated differently, the opening 116 may be football- or eye-shaped. The shape and size of the opening 116 may approximate the shape and size of the vent 120 (i.e., the region defined by a perimeter formed by the free end 134 of the first flap 130 and the free end 144 of the second flap 140 when the vent 120 is in the closed state). In other words, both the opening 116 and the vent 120 may be biconvex in shape. In some embodiments, the opening 116 encompasses a larger area than that encompassed by the region defined by a perimeter formed by the free end 134 of the first flap 130 and the free end 144 of the second flap 140.

As shown in FIG. 2B, the first piece of material 102, the second piece of material 104, and the panel 112 may be coupled to one another. For example, such coupling may be accomplished via stitching 170 that extends around a perimeter of the vent 120. More particularly, stitching 170 may be sewn around a periphery of the opening 116 to couple the first piece of material 102 and the second piece of material 104 to the panel 112. In the embodiment of FIGS. 2A and 2B, the stitching 170 includes and upper portion of stitching 170 and a lower portion of stitching 170, such that the stitching 170 extends around an entirety of both the vent 120 and the opening 116. The upper portion of stitching 170 may intersect the lower portion of stitching 170 adjacent the ends 150a, 150b, 160a, 160b of the slits 150, 160. The upper portion of the stitching 170 may taper away from the ends 150a, 150 of the first slit 150 to limit or even eliminate interference of the stitching 170 with the first flap 130. Similarly, the lower portion of the stitching 170 may taper away from the ends 160a, 160b of the second slit 160 to limit or even eliminate interference of the stitching 170 with the second flap 140.

In other embodiments, the stitching extends only partway around the vent and/or the opening. In some embodiments, the stitching 170 may include a plurality of parallel rows of stitches. Other stitching patterns may also be used in other embodiments. Further, other coupling mechanisms may be used to attach the first piece of material 102 and the second piece of material 104 to the panel 112, such as adhesives, taping, welding (e.g., radio frequency welding), heat sealing, or any other suitable technique or combination of techniques. In other words, one or more of the first flap 130 and the second flap 140 may be coupled to the panel 112 via one or more of such coupling mechanisms. The stitching 170 or other coupling mechanisms may restrict the extent to which the vent 120 may open and/or prevent damage to (e.g., tearing of) the airbag cushion 110.

Figure 3:
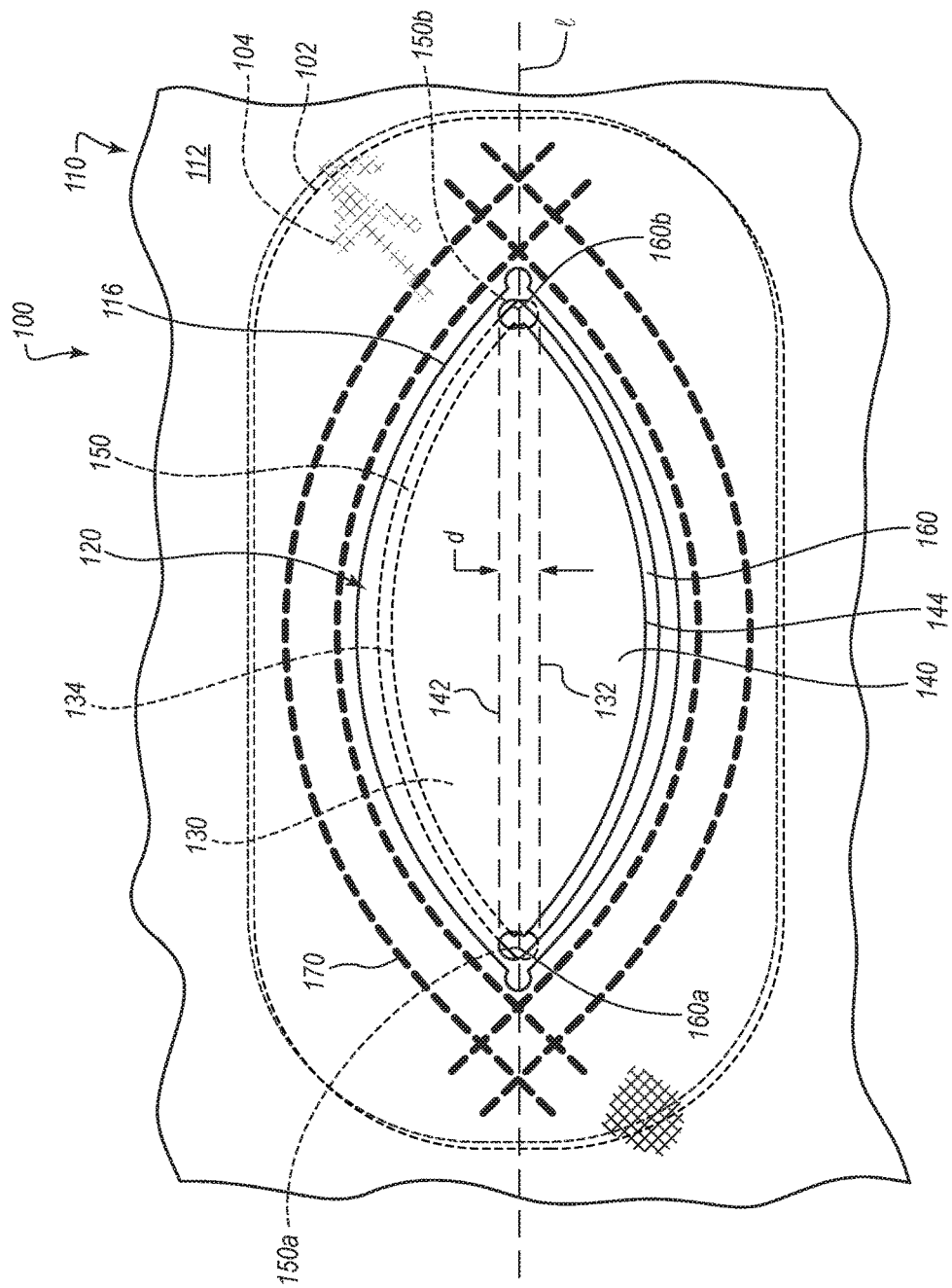
FIG. 3 is a close-up exterior plan view of the vent of FIGS. 2A and 2B.

FIG. 3 provides an exterior plan view of a portion of the airbag 100 that includes the vent 120. As shown in FIG. 3, the stitching 170 may couple an outer panel 112 of the airbag cushion 110 to both a first piece of material 102 and a second piece of material 104 such that the first piece of material 102 is disposed inward of the second piece of material 104 when the vent 120 is in a closed state. Stated differently, these elements may be coupled to one another such that both the first piece of material 102 and the second piece of material 104 are positioned at an interior of the inflatable chamber when the vent 120 is in the closed state. The stitching 170, as noted above, may include (1) a plurality of curved parallel rows of stitches that extend above a top portion of the vent 120 (e.g., an upper portion of the stitching) and (2) a plurality of curved parallel rows of stitches that extend below a bottom portion of the vent 120 (e.g., a lower portion of the stitching). The rows of stitches that extend above a top portion of the vent 120 may overlap with the rows of stitches that extend below a bottom portion of the vent 120 adjacent opposite ends of the vent 120 (e.g., ends that are bisected by the longitudinal axis (l)), thereby reducing the risk of tearing adjacent such ends.

In some embodiments, the first flap 130 partially overlaps with the second flap 140 when the vent 120 is in the closed state. For instance, as depicted in FIG. 3, the first flap 130 extends from a secured end 132 to a free end 134, while the second flap 140 extends from a secured end 142 to a free end 144. In FIG. 3, the flaps 130, 140 are positioned such that the flaps 130, 140 form an overlap region (d) that extends from the secured end 132 of the first flap 130 to the secured end 142 of the second flap 140. In some embodiments, the extent of such overlap may be a function of the width of the slits 150, 160 that form the flaps 130, 140. Overlap of the flaps 130, 140 may facilitate increased venting from the airbag 100 when the vent 120 is in the open state. Stated differently, the overlap may allow for an increased distance of separation between the first flap 130 and the second flap 140 when the vent 120 is in the open state. Indeed, in some embodiments, the overlap region (d) may define the width of the elongate aperture of the vent 120 in the open state.

Overlapping flaps 130, 140 may result from overlap of the slits 150, 160 that form the flaps 130, 140. Stated differently, in some embodiments, at least one portion of the first slit 150 may overlap with at least one portion of the second slit 160 when the vent 120 is in the closed state. For instance, as shown in FIG. 3, a first end 150a of the first slit 150 may overlap with a first end 160a of the second slit 160. Likewise a second end 150b of the first slit 150 that is disposed opposite of the first end 150a of the first slit 150 may overlap with a second end 160b of the second slit 160 that is disposed opposite the first end 160a of the second slit 160. In other embodiments, the slits overlap one another at a position other than the ends of the slits. For example, the first slit and the second slit may overlap adjacent to—but not at—opposite ends of the slits. In some embodiments, the one or more slits 150, 160 may be wider at or adjacent to the ends 150a, 150b, 160a, 160b of the slit 150, 160 than at other locations along the length of the slit 150, 160. The wider portions of the slit 150, 160 may function as relief areas that minimize or otherwise reduce bunching of the flaps 130, 140 adjacent the ends of the vent 120. For example, in the depicted embodiment, each slit 150, 160 includes a hole at each end 150a, 150b, 160a, 160b of the slit 150, 160 that functions as a relief area. In some embodiments, only the slit in the second piece of material 104 (e.g., slit 160) is widened at or adjacent to the ends 160a, 160b of the slit 160.

In some embodiments (not shown), one or more of the free end 134 of the first flap 130 and the free end 144 of the second flap 140 are temporarily secured via a break stitch. For example, the first flap 130 may be temporarily secured to the second piece of material 104 via a break stitch. In other or further embodiments, the second flap 140 is temporarily secured to the first piece of material 102 via a break stitch. The break stitch(es) may be designed to break when a predetermined level or degree of force is applied against one or more of the flaps 130, 140. In this manner, the vent 120 may remain in a closed state until the pressure within the airbag cushion 110 causes the break stitch(es) to tear. Once the break stitch(es) have been torn, the flaps 130, 140 may be displaced such that the free ends of the flaps 130, 140 are positioned at an exterior of the inflatable chamber, thereby transitioning the vent 120 from a closed state to an open state.

In the embodiment depicted in FIGS. 1A-3, the vent 120 is oriented such that when the vent 120 is in the closed state (1) the free end 144 of the outermost flap 140 is disposed below the secured end 142 of the outermost flap 140 and (2) the free end 134 of the innermost flap 130 is disposed above the secured end 132 of the innermost flap 130. However, as can be appreciated, the orientation of the flaps 130, 140 may be reversed (or the vent 120 may be rotated relative to the airbag cushion 110) such that (1) the free end of the outermost flap is disposed above the secured end of the outermost flap and (2) the free end of the innermost flap is disposed below the secured end of the innermost flap. Such alternative configurations are within the scope of this disclosure. Also, while only one vent 120 of the airbag 100 has been described in connection with FIGS. 1A-3, airbags that include two or more vents that are analogous to the vent 120 described above are also within the scope of this disclosure. For example, in some embodiments, a first vent is disposed on a first lateral side of the airbag, while a second vent is disposed on a second lateral side of the airbag.

FIGS. 4A-5B depict an embodiment of an airbag 200 (or portions thereof) that resembles the airbag 100 described above in certain respects. Accordingly, like features are designated with like reference numerals, with the leading digits incremented to "2." For example, the embodiment depicted in FIGS. 4A-5B includes stitching 270 that may, in some respects, resemble the stitching 170 of FIGS. 1A-3. Relevant disclosure set forth above regarding similarly identified features thus may not be repeated hereafter. Moreover, specific features of airbags and related components shown in FIGS. 1A-3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag 200 and related components depicted in FIGS. 4A-5B. Any suitable combination of the features, and variations of the same, described with respect to the airbag 100 and related components illustrated in FIGS. 1A-3 can be employed with the airbag 200 and related components of FIGS. 4A-5B, and vice versa.

FIGS. 4A and 4B provide perspective views of an interior portion of an airbag 200 that includes a vent 220. More specifically, FIG. 4A provides an exploded view of the vent 220, while FIG. 4B provides an assembled view of the vent 220.

With reference to FIGS. 4A and 4B, the airbag 200 includes an airbag cushion 210 that defines an inflatable chamber and a vent 220. In the depicted embodiment, the vent 220 is formed from a first piece of material 202 and a second piece of material 204. In the embodiment of FIGS. 4A and 4B, the second piece of material 204 is an outer panel 212 of the airbag cushion 210. The vent 220 may be shaped in a manner analogous to that described above in connection with other embodiments.

When the vent 220 is in the closed state, the first piece of material 202 is positioned inward of the second piece of material 204 (i.e., panel 212). In this manner, a first flap 230 is positioned at an interior of the inflatable chamber when the vent 220 is in the closed state.

The first piece of material 202 includes a first flap 230 that is formed from a first slit 250. The first flap 230 includes a free top end 234 and a secured bottom end 232. The free end 234 of the first flap 230 extends from the secured end 232 of the first flap 230 in a first direction. For example, when the vent 220 is installed within a vehicle, the free end 234 may extend in a first (e.g., generally upward) direction from the secured end 232. The first flap 230 may be any suitable shape. For example, in the depicted embodiment, the flap 230 is D-shaped, similar to the flap 130 described above in connection with FIGS. 1A-3.

The slit 250 may be formed in any suitable manner. In some embodiments, the slit 250 has a maximum width of approximately 1 mm, 2 mm, 3 mm, 4 mm, and/or 5 mm. A relatively large width in the slit 250 may facilitate increased venting relative to a more narrow width in the slit 250. In some embodiments, the slit 250 may widen at one or more ends 250a, 250b of the slit 250, thereby forming one or more relief areas that reduce the likelihood of flap material bunching adjacent the ends of the vent 220 during a deployment event.

The second piece of material 204 (i.e., panel 212) may be attached to the first piece of material 202 such that the second piece of material 204 is disposed outward of the first piece of the material 202 when the vent 220 is in the closed state. In the embodiment of FIGS. 4A-4B, the second piece of material 204 is a panel of an airbag (or portion thereof) and includes a second flap 240 that is formed from a second slit 260. In other words, in the depicted embodiment of FIGS. 4A and 4B, the second flap 240 is formed from the panel 212 of the airbag cushion 210. The second flap 240 and the second slit 260 may be similar to the first flap 230 and the first slit 250 in many respects. For example, the size, shape, material, and other characteristics of the first flap 230 and first slit 250 are generally applicable to the second flap 240 and the second slit 260. For instance, the ends 260a, 260b of the second slit 260 may be analogous to the ends 250a, 250b, of the first slit 250. In the embodiment of FIGS. 4A and 4B, the panel 212 lacks an opening analogous to the opening 116 described above in reference to FIGS. 1A-3.

When the airbag 200 is deployed within a vehicle and the vent 220 is in the closed state, the free end 244 of the second flap 240 may extend from the secured end 242 in a generally downward direction. In other words, the free end 234 of the first flap 230 may extend from the secured end 232 of the first flap 230 in a first (e.g., upward) direction, while the free end 244 of the second flap 240 extends from the secured end 242 of the second flap 240 in a second (e.g., downward) direction that is opposite of the first direction.

Figure 5A:
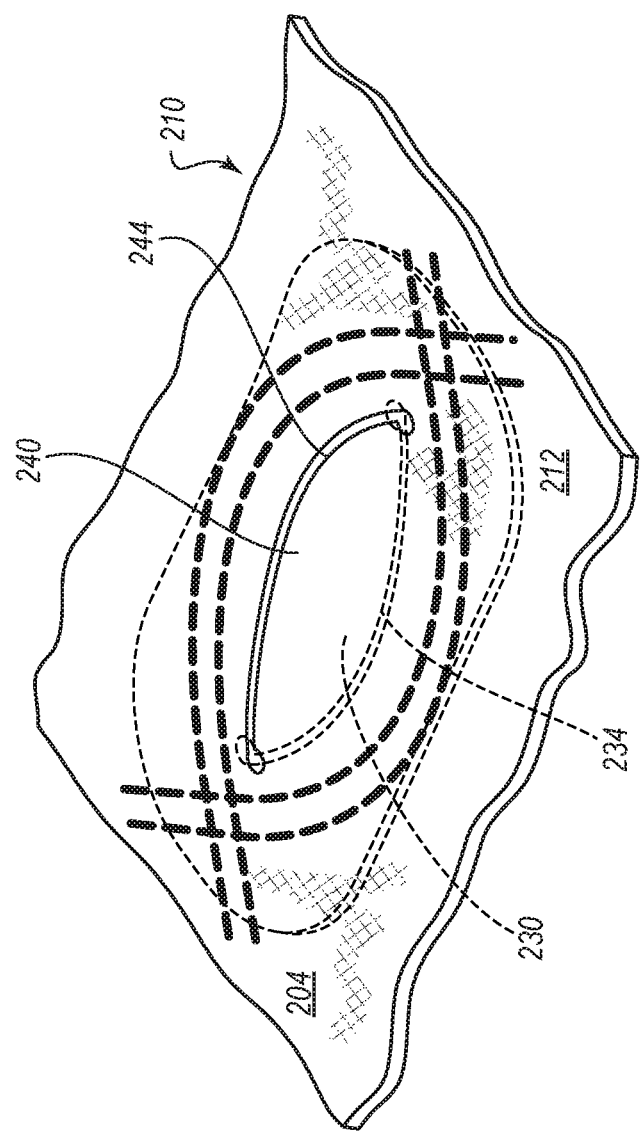
FIG. 5A is an exterior perspective view of the vent of FIGS. 4A and 4B in a closed state.
Figure 5B:
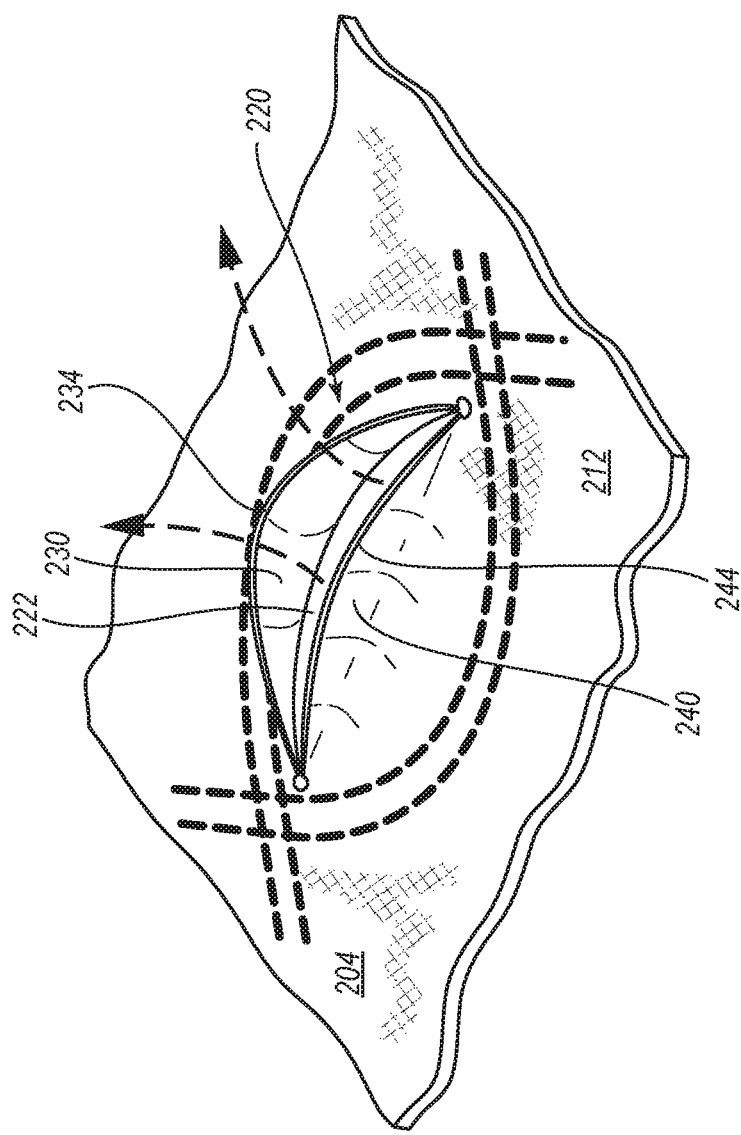
FIG. 5B is an exterior perspective view of the vent of FIG. 5A in an open state.

FIGS. 5A and 5B provide exterior perspective views of a portion of the airbag 200 that includes the vent 220. When the vent 220 is in the closed state as shown in FIG. 5A, the flaps 230, 240 impede fluid flow through the vent 220. For example, during an early stage of deployment, the first flap 230 may be disposed against the second piece of material 204 (i.e., panel 212). As pressure builds up within the airbag cushion 210, outward displacement of the first flap 230 is initially impeded by the second piece of material 204, thereby maintaining the vent 220 in the closed state.

However, as pressure buildup within the airbag cushion 210 further increases (e.g., due to (1) the delivery of inflation gas, (2) the expansion of inflation gas, and/or (3) occupant engagement with the airbag cushion 210), the free end 234 of the first flap 230 may overcome the resistance provided by the second piece of material 204 (i.e., panel 212) and be displaced in an outward direction. The free end 244 of the second flap 240 may also be displaced in an outward direction.

FIG. 5B shows the vent 220 in an open state in which the free ends 234, 244 of the first flap 230 and the second flap 240 are positioned at an exterior of the inflatable chamber of the airbag cushion 210. In this configuration, inflation gas may exit from the vent 220 through the aperture 222. The increase in venting capacity resulting from the transition from the closed state to the open state may improve occupant ride-down.

Figure 6:
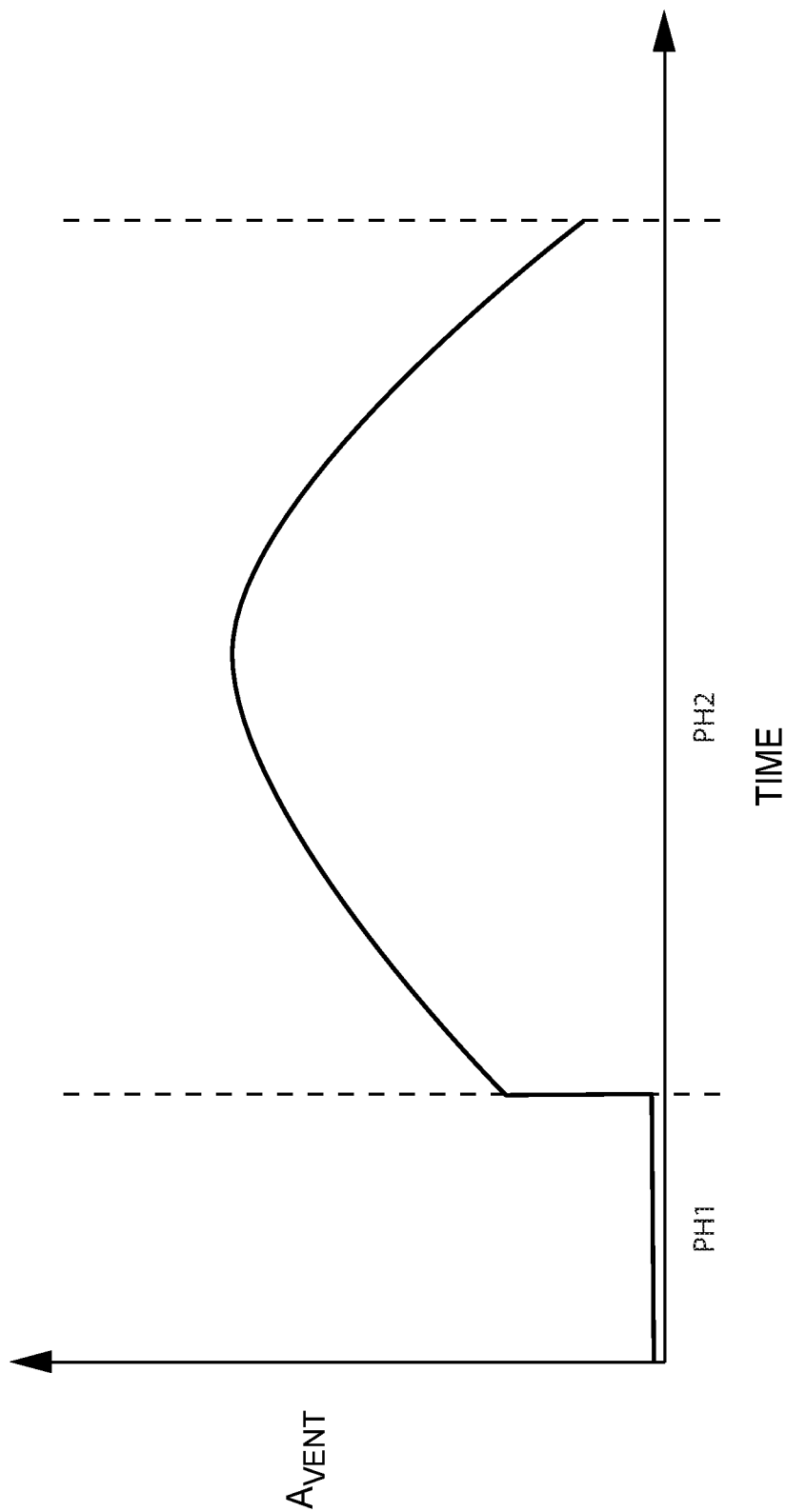
FIG. 6 is a graph that provides a schematic representation of the venting capacity of an airbag cushion as a function of time during a deployment event.

FIG. 6 is a graph providing a schematic representation of the open area of a vent ($A_{VENT}$), such as some embodiments of vents disclosed herein, as a function of time during airbag deployment. The first phase (PH1) represents the filling stage of the airbag. In this stage, the vent may be in a closed state. In such a state, the first flap and the second flap impede fluid flow through the vent. The vent may be in a "closed" state even though, as shown on the graph, a small amount of inflation gas may pass through the vent during the first phase.

Subsequently, the airbag may transition from a closed state to an open state. A rapid transition from the closed state to the open state is indicated in FIG. 6 by the first vertical broken line. Such a transition may result from (1) an increase in pressure within the airbag cushion and/or (2) occupant impact with the airbag cushion. For example, as pressure within the airbag cushion increases (due to the delivery of inflation gas and/or occupant impact), an outward force may be exerted on the flaps, causing the free ends of the flaps to be displaced such that flaps are positioned at an exterior of the inflatable chamber. The displacement of the free ends in this manner may create an aperture that permits significantly more venting from the inflatable chamber. In this manner, the airbag may release gas at a rate that is appropriate for controlled occupant ride-down during the second phase (PH2). Other arrangements or conditions may yield graphs that differ somewhat from the graph depicted in FIG. 6.

Figure 7:
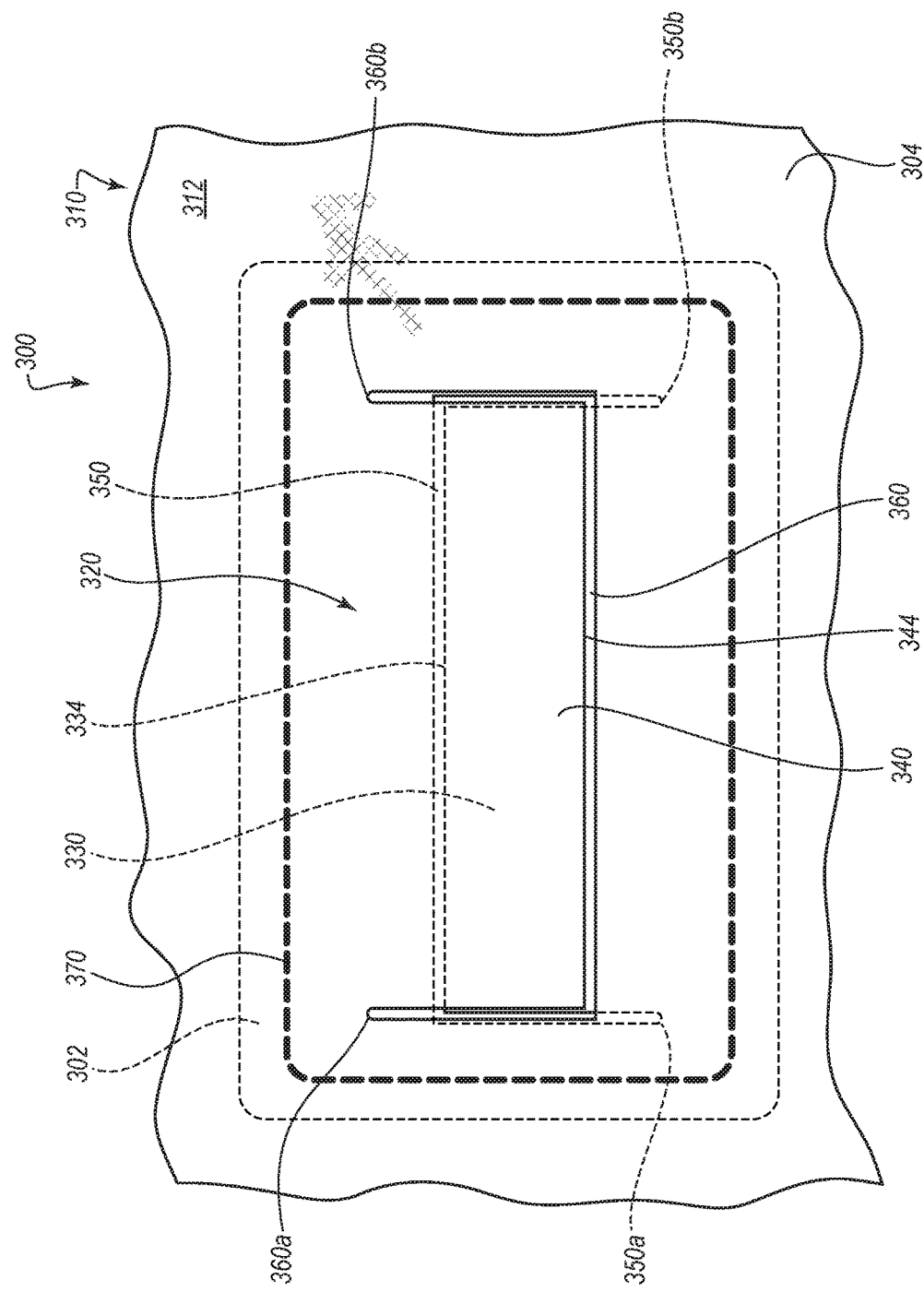
FIG. 7 is a close-up exterior plan view of a vent according to another embodiment.

FIG. 7 provides a close-up exterior plan view of an airbag 300, according to another embodiment. The airbag 300 includes a rectangular vent 320 and an airbag cushion 310 that defines an inflatable chamber. The vent 320 is formed from a first piece of material 202 that is positioned inward of the second piece of material 304 (i.e., panel 312).

The first piece of material 302 includes a first flap 330 that is formed from a first slit 350. The first flap 330 includes a free top end 334. The second piece of material 304 includes a second flap 340 that is formed from a second slit 360. The second flap 340 includes a free bottom end 344. The second piece of material 304 (i.e., panel 312) may be attached to the first piece of material (e.g., via stitching 370) such that the second piece of material 304 is disposed outward of the first piece of material 302 when the vent 320 is in the closed state.

In the embodiment of FIG. 7, the free ends 334, 344 of the flaps 330, 340 overlap when the vent 320 is in a closed state. Stated differently, in the embodiment depicted in FIG. 7, an overlap region is defined by the distance between the free end 334 of the first flap 330 and the free end 344 of the second flap 340. When the vent 320 is in an open state, the vent 320 may form a substantially rectangular aperture. The aperture of the vent 320 may extend from the first and second ends 360a, 360b of the second slit 360 to the first and second ends 350a, 350b of the first slit 350. In some embodiments, the vent 320 may be square in shape.

Figure 8:
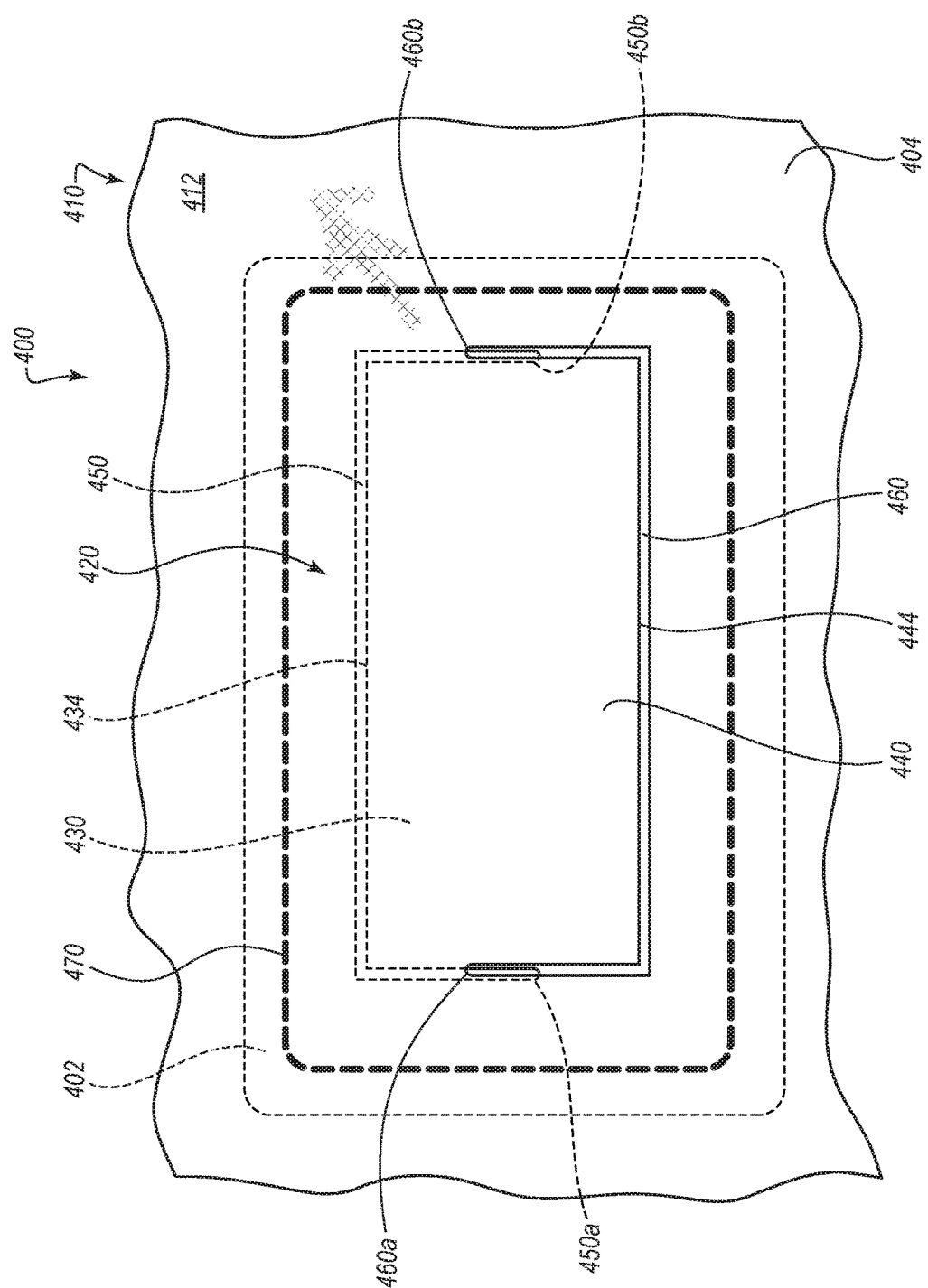
FIG. 8 is a close-up exterior plan view of a vent according to another embodiment.

FIG. 8 provides a close-up exterior plan view of an airbag 400, according to another embodiment. The airbag 400 includes a rectangular vent 420 and an airbag cushion 410 that defines an inflatable chamber. The vent 420 is formed from a first piece of material 402 that is positioned inward of the second piece of material 404 (i.e., panel 412).

The first piece of material 402 includes a first flap 430 that is formed from a first slit 450. The first flap 430 includes a free top end 434. The second piece of material 404 includes a second flap 440 that is formed from a second slit 460. The second flap 440 includes a free bottom end 444. The second piece of material 404 (i.e., panel 412) may be attached to the first piece of material (e.g., via stitching 470) such that the second piece of material 404 is disposed outward of the first piece of material 402 when the vent 420 is in the closed state.

In the embodiment of FIG. 8, the secured ends of the flaps 430, 440 overlap when the vent 420 is in a closed state. In this same closed state, the free ends 434, 444 of the flaps 330, 340 do not overlap. Stated differently, in the embodiment depicted in FIG. 8, an overlap region is defined by the distance between the secure end of the first flap 430 and the secured end 444 of the second flap 440. When the vent 420 is in an open state, the vent 420 may form a substantially rectangular aperture. The aperture of the vent 420 may extend from the first and second ends 460a, 460b of the second slit 460 to the first and second ends 450a, 450b of the first slit 450.

Figure 9:
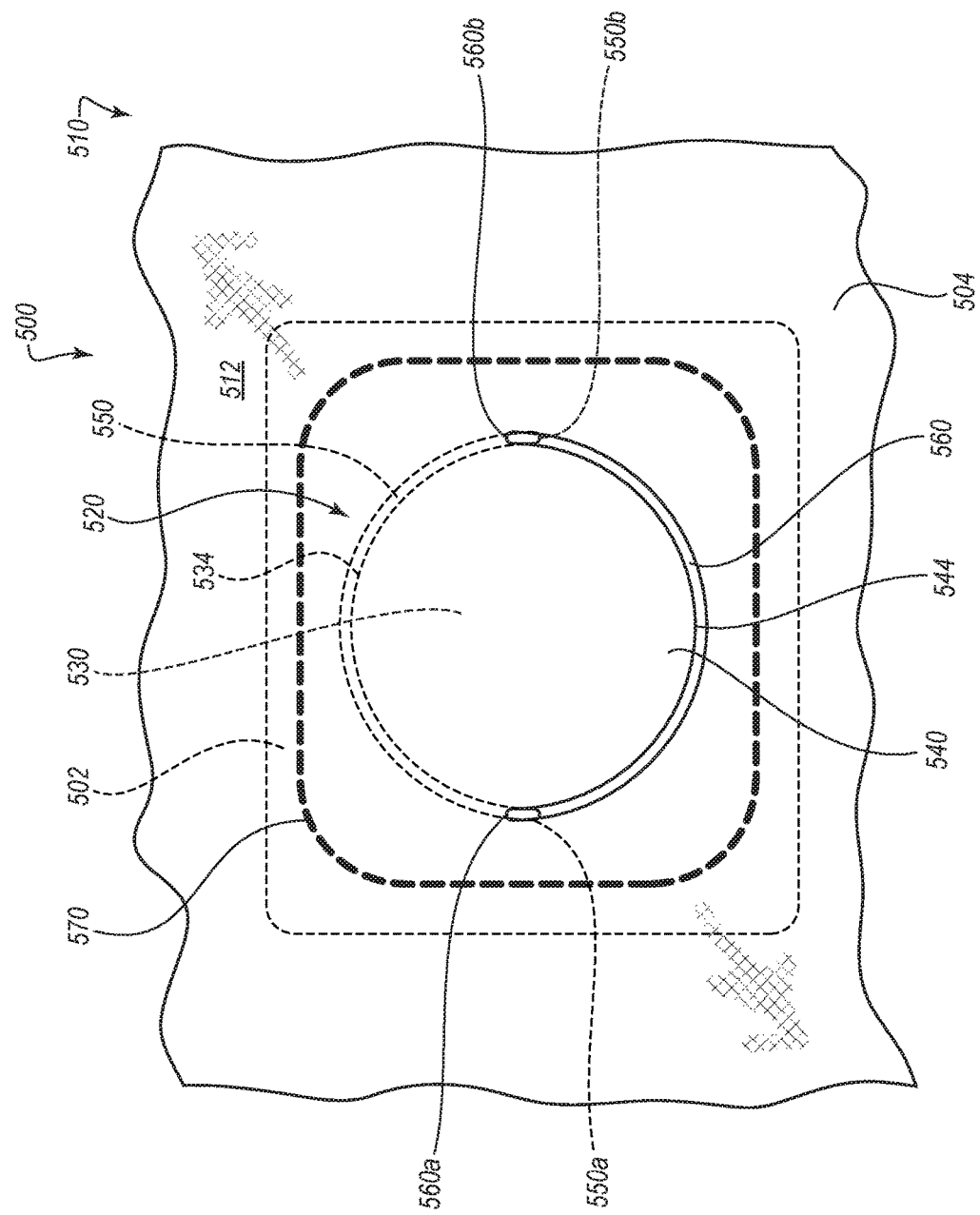
FIG. 9 is a close-up exterior plan view of a vent according to another embodiment.

FIG. 9 provides a close-up exterior plan view of an airbag 500, according to another embodiment. The airbag 500 includes a circular vent 520 and an airbag cushion 510 that defines an inflatable chamber. The vent 520 is formed from a first piece of material 502 that is positioned inward of the second piece of material 504 (i.e., panel 512).

The first piece of material 502 includes a first flap 530 that is formed from a first slit 550. The first flap 530 includes a free top end 534. The second piece of material 504 includes a second flap 540 that is formed from a second slit 560. The second flap 540 includes a free bottom end 544. The second piece of material 504 (i.e., panel 512) may be attached to the first piece of material (e.g., via stitching 570) such that the second piece of material 504 is disposed outward of the first piece of material 502 when the vent 520 is in the closed state.

In the embodiment of FIG. 9, the secured ends of the flaps 530, 540 overlap when the vent 520 is in a closed state. In this same closed state, the free ends 534, 544 of the flaps 530, 540 do not overlap. Stated differently, in the embodiment depicted in FIG. 9, an overlap region is defined by the distance between the secured end of the first flap 530 and the secured end of the second flap 540. When the vent 520 is in an open state, the vent 520 may form a substantially rectangular aperture. The aperture of the vent 520 may extend from the first and second ends 560*a*, 560*b* of the second slit 560 to the first and second ends 550*a*, 550*b* of the first slit 550.

Figure 10:
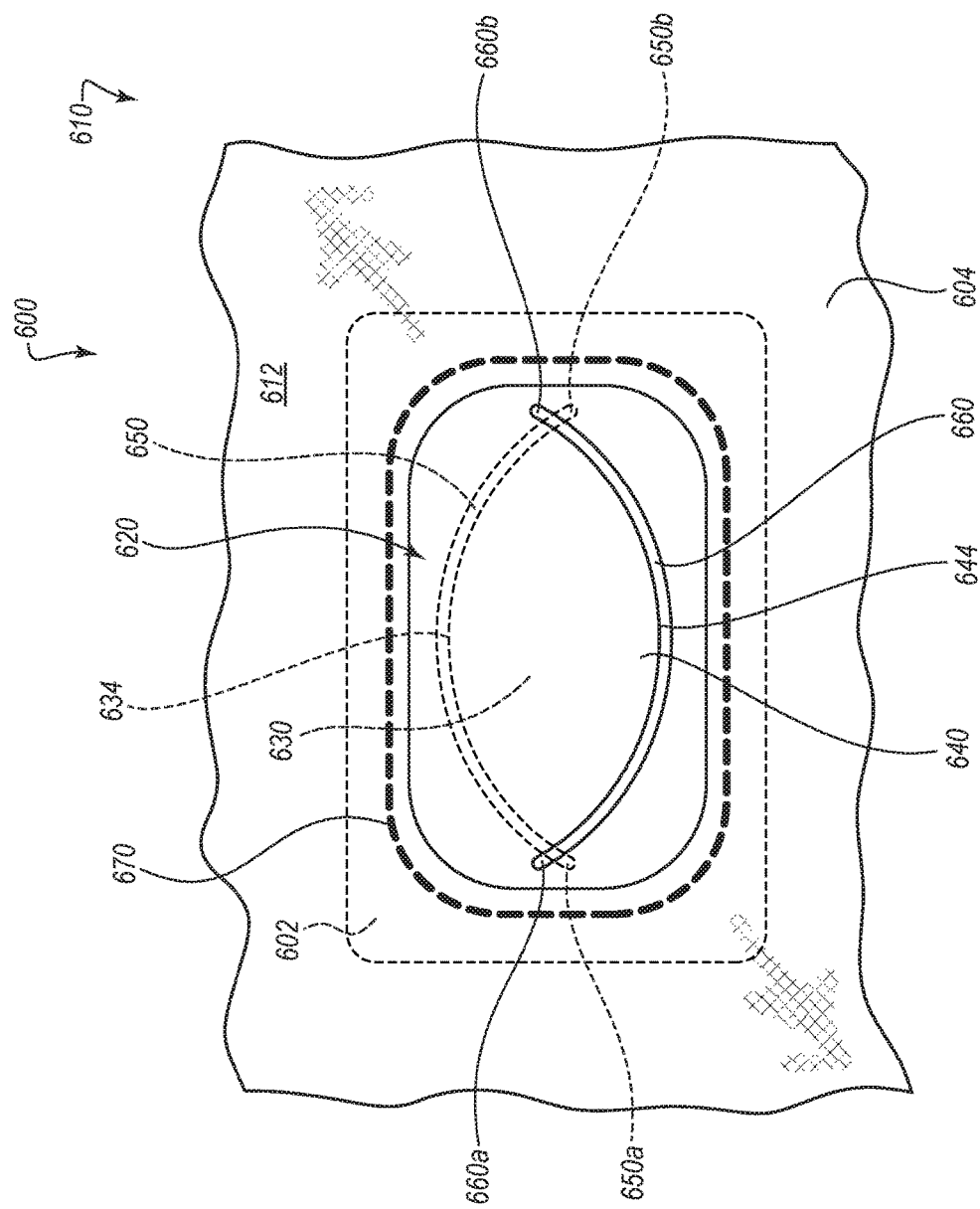
FIG. 10 is a close-up exterior plan view of a vent according to another embodiment.

FIG. 10 provides a close-up exterior plan view of an airbag 600, according to another embodiment. The airbag 600 includes an eye-shaped vent 620 and an airbag cushion 610 that defines an inflatable chamber. The vent 620 is formed from a first piece of material 602 that is positioned inward of the second piece of material 604 (i.e., panel 612).

The first piece of material 602 includes a first flap 630 that is formed from a first slit 650. The first flap 630 includes a free top end 634. The second piece of material 604 includes a second flap 640 that is formed from a second slit 660. The second flap 640 includes a free bottom end 644. The second piece of material 604 (i.e., panel 612) may be attached to the first piece of material (e.g., via stitching 670) such that the second piece of material 604 is disposed outward of the first piece of material 602 when the vent 620 is in the closed state.

In the embodiment of FIG. 10, the secured ends of the flaps 630, 640 overlap when the vent 620 is in a closed state. The slits 650, 660 overlap at points along each slit 650, 660 that are inward of the ends 650*a*, 650*b*, 660*a*, 660*b* of the slits 650, 660 when the vent is in the closed state. In this same closed state, the free ends 634, 644 of the flaps 630, 640 do not overlap. Stated differently, in the embodiment depicted in FIG. 10, an overlap region is defined by the distance between the secured end of the first flap 630 and the secured end of the second flap 640. When the vent 620 is in an open state, the vent 620 may form a substantially rectangular aperture. The aperture of the vent 620 may extend from the first and second ends 660*a*, 660*b* of the second slit 660 to the first and second ends 650*a*, 650*b* of the first slit 650.

Figure 11:
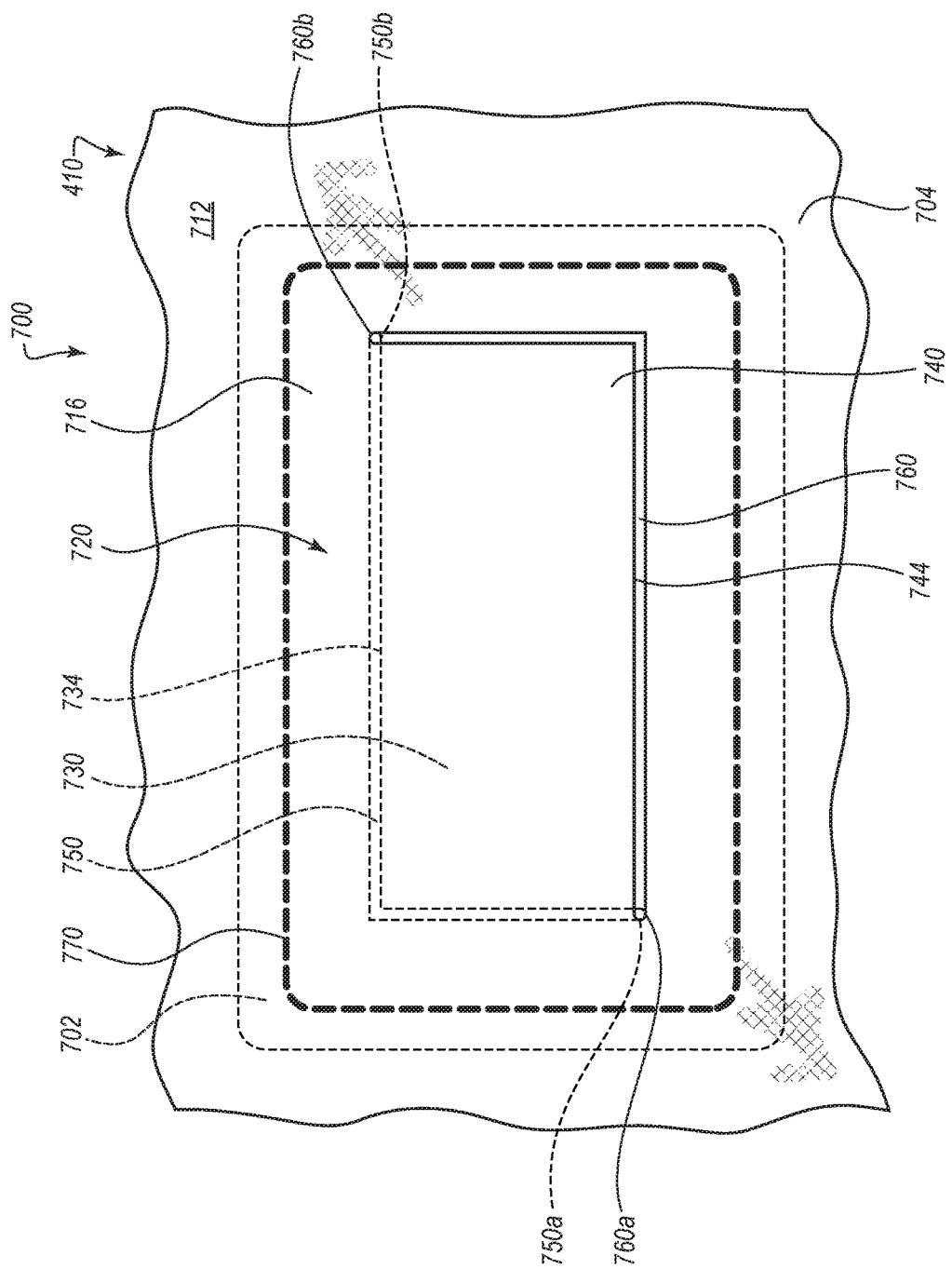
FIG. 11 is a close-up exterior plan view of a vent according to another embodiment.

FIG. 11 provides a close-up exterior plan view of an airbag 700, according to another embodiment. The airbag 700 includes a rectangular vent 720 and an airbag cushion 710 that defines an inflatable chamber. The vent 720 is formed from a first piece of material 702 that is positioned inward of the second piece of material 704 (i.e., panel 612).

The first piece of material 702 includes a first flap 730 that is formed from a first slit 750. The second piece of material 704 includes a second flap 740 that is formed from a second slit 760. The second piece of material 704 (i.e., panel 712) may be attached to the first piece of material 702 (e.g., via stitching 770) such that the second piece of material 704 is disposed outward of the first piece of material 702 when the vent 720 is in the closed state.

In the embodiment of FIG. 11, the secured ends of the flaps 730, 740 overlap when the vent 720 is in a closed state. In this same closed state, the free ends 734, 744 of the flaps 730, 740 do not overlap. Stated differently, in the embodiment depicted in FIG. 11, an overlap region is defined by the distance between the secured end of the first flap 730 and the secured end of the second flap 740. This overlap region extends diagonally from the bottom left-hand corner 750*a*, 760*a*, of the slits 750, 760 to the upper right-hand corner 750*b*, 760*b* of the slits 750, 760. When the vent 620 is in an open state, the vent 620 may form a substantially rectangular aperture that extends diagonally relative to the rectangular shape defined by the slits 750, 760.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

I claim:

1. An airbag comprising:
   an airbag cushion defining an inflatable chamber that is configured to receive inflation gas from an inflator; and
   a passive vent that is configured to, during a deployment event, transition from a closed state to an open state to vent air through a panel of the airbag cushion, the vent comprising:
   a first flap comprising a secured bottom end and a free top end; and
   a second flap comprising a secured top end and a free bottom end,
   wherein the first flap and the second flap impede fluid flow through the vent when the vent is in the closed state, and
   wherein the free ends of the first flap and the second flap are positioned at an exterior of the inflatable chamber and allow fluid flow through the vent when the vent is in the open state.

2. The airbag of claim 1, wherein either:
   the first flap is formed from the panel, and the second flap is formed from a different piece of material coupled to the panel; or
   the second flap is formed from the panel, and the first flap is formed from a different piece of material coupled to the panel.

3. The airbag of claim 1, wherein:
   the first flap is formed from a first piece of material;
   the second flap is formed from a second piece of material; and the first piece of material and the second piece of material are coupled to the panel.

4. The airbag of claim 1, wherein the first flap and the second flap partially overlap when the vent is in the closed state.

5. The airbag of claim 1, wherein the first flap and second flap of the vent form an elongate aperture when in the open state.

6. The airbag of claim 1, wherein the first flap and second flap are substantially D-shaped.

7. The airbag of claim 1, wherein the panel is an outer panel.

8. The airbag of claim 1, wherein
a perimeter of the vent is defined by the free ends of the first flap and the second flap when the vent is in the closed state, and
wherein the shape of the perimeter of the vent is biconvex.

9. The airbag of claim 1, wherein one or more of the first flap and the second flap are positioned at an interior of the inflatable chamber when the vent is in the closed state.

10. The airbag of claim 1, wherein one or more of the first flap and the second flap are coupled to the panel via one or more of stitching, radio frequency welding, and heat sealing.

11. The airbag of claim 1, wherein the vent is configured to transition from the closed state to the open state in response to increased pressurization within the airbag cushion upon engagement of the airbag cushion with an out-of-position occupant.

12. The airbag of claim 1, wherein the vent is configured to transition from the closed state to the open state at a predetermined pressure within the inflatable chamber of the airbag cushion.

13. The airbag of claim 1, wherein one or more of the free end of the first flap and the free end of the second flap are temporarily secured via a break stitch.

14. The airbag of claim 1, wherein:
the first flap is formed from a first slit; and
the second flap is formed from a second slit;
wherein at least one portion of the first slit overlaps with at least one portion of the second slit when the vent is in the closed state.

15. The airbag of claim 14, wherein the first and second slits each define a curve.

16. The airbag of claim 14, wherein the first slit and the second slit overlap adjacent opposite ends of the slits.

17. An airbag comprising:
an airbag cushion formed of one or more panels defining an inflatable chamber that is configured to receive inflation gas from an inflator; and
a vent disposed through a panel of the one or more panels of the airbag cushion to, during a deployment event, transition from a closed state to an open state to vent air through from the inflatable chamber, the vent comprising:
a first flap comprising a secured end and a free end; and
a second flap comprising a secured end and a free end, the second flap oriented opposite the first flap,
wherein the first flap and the second flap at least partially overlap to impede fluid flow through the vent when the vent is in the closed state,
wherein, when pressurization within the inflatable chamber exceeds a threshold, the free ends of the first flap and the second flap are forced outward to extend transverse to the panel of the airbag cushion to transition the vent to the open state;
wherein the first flap is formed from a first slit in a first piece of material and the second flap is formed from a second slit in a second piece of material, and
wherein at least a portion of the first slit overlaps with at least a portion of the second slit when the vent is in the closed state.

18. The airbag of claim 17, wherein the first flap and second flap of the vent form an elongate aperture in the open state.

19. The airbag of claim 18, wherein ends of the first slit are displaced from ends of the second slit,
wherein a distance of displacement of the ends define a width of the elongate aperture of the vent in the open state.

20. The airbag of claim 18, wherein one of the first piece of material and the second piece of material is the panel of the airbag cushion.

* * * * *